US010474955B1

(12) United States Patent
Santhanam et al.

(10) Patent No.: US 10,474,955 B1
(45) Date of Patent: Nov. 12, 2019

(54) NETWORK DEVICE MANAGEMENT

(71) Applicant: Juniper Networks, Inc., Sunnyvale, CA (US)

(72) Inventors: Srivatsan Santhanam, Bangalore (IN); Tapan Kumar Chauhan, Bangalore (IN); Aniruddha Bhosekar, Bangalore (IN); Ankit Anand, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 469 days.

(21) Appl. No.: 15/373,309

(22) Filed: Dec. 8, 2016

(51) Int. Cl.
*H04L 12/24* (2006.01)
*G06N 5/04* (2006.01)
*H04L 12/26* (2006.01)
*G06N 20/00* (2019.01)
*H04L 12/707* (2013.01)

(52) U.S. Cl.
CPC ............. *G06N 5/046* (2013.01); *G06N 20/00* (2019.01); *H04L 41/12* (2013.01); *H04L 41/147* (2013.01); *H04L 43/08* (2013.01); *H04L 45/22* (2013.01)

(58) Field of Classification Search
CPC ......... H04L 43/08; H04L 45/22; H04L 41/12; H04W 24/04
See application file for complete search history.

(56) References Cited

U.S. PATENT DOCUMENTS

| 2016/0065736 | A1* | 3/2016 | Pedersen | H04M 3/51 379/266.07 |
| 2016/0239185 | A1* | 8/2016 | Balimidi | G06F 3/0482 |
| 2017/0019312 | A1* | 1/2017 | Meyer | G06N 5/048 |

* cited by examiner

*Primary Examiner* — Chirag R Patel
(74) *Attorney, Agent, or Firm* — Harrity & Harrity, LLP

(57) ABSTRACT

A device may receive, from a set of elements of a set of network devices, information associated with a set of parameters. The device may determine an event based on the set of parameters. The device may determine a rule set based on the event. The device may determine other events that are associated with the event based on the rule set. The device may determine statuses of the other events based on the information associated with the set of parameters. The device may evaluate a rule, of the rule set, based on the event and the statuses of the other events. The device may determine an action to be performed based on evaluating the rule. The device may cause the action to be performed in association with the element of the set of elements.

20 Claims, 10 Drawing Sheets

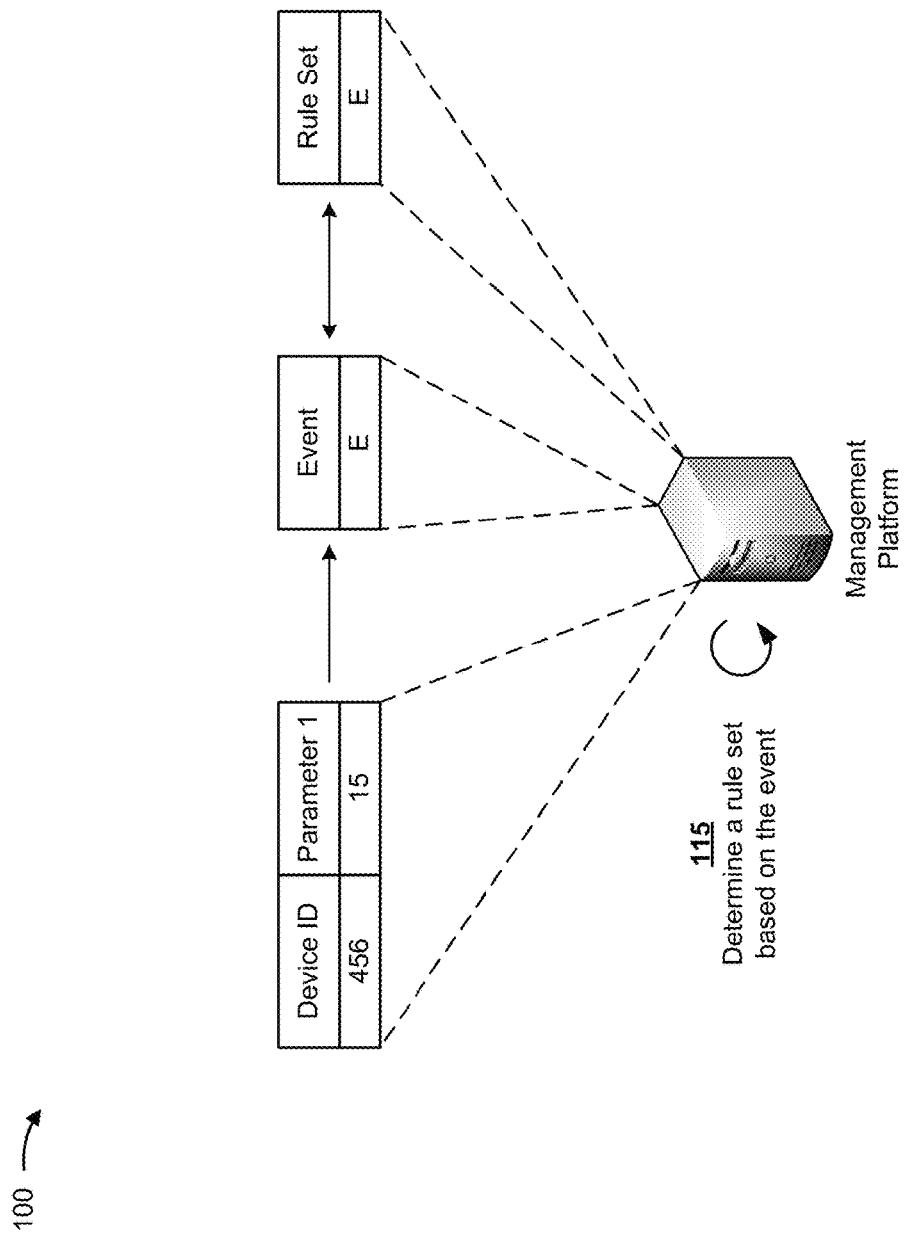

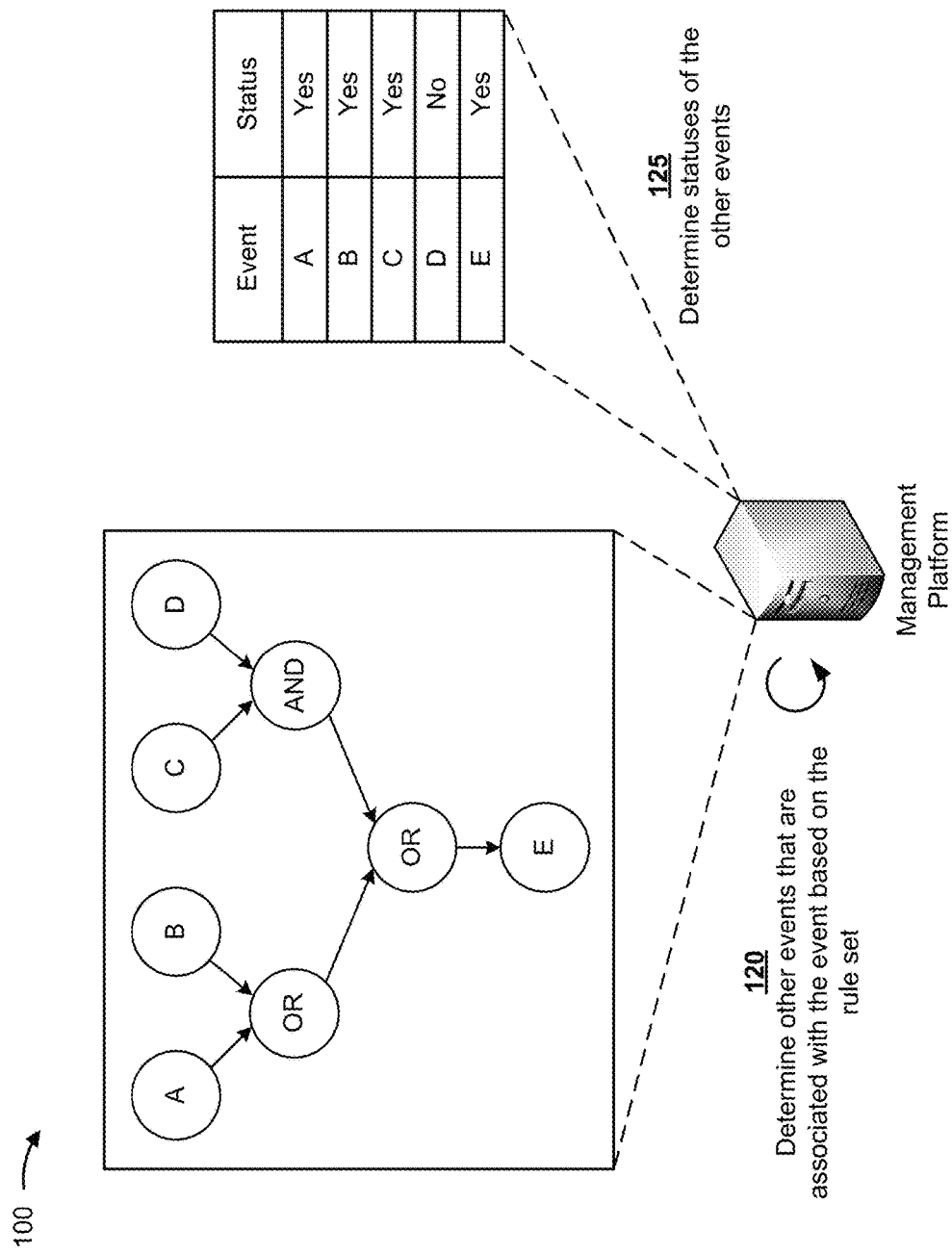

NETWORK DEVICE MANAGEMENT

BACKGROUND

An inference engine may apply logical rules to a knowledge base and deduce new knowledge. For example, an inference engine may apply a forward chaining approach in association with a data set, which enables the inference engine to identify conditions that are true, and determine (e.g., conclude, infer, etc.) a result based on the conditions being true.

SUMMARY

According to some possible implementations, a device may include one or more processors to receive, from a set of elements of a set of network devices, information associated with a set of parameters. The one or more processors may determine an event based on the set of parameters. The event may be associated with an element of the set of elements. The one or more processors may determine a rule set based on the event. The one or more processors may determine other events that are associated with the event based on the rule set. The other events may be associated with other elements of the set of elements. The one or more processors may determine statuses of the other events based on the information associated with the set of parameters. The one or more processors may evaluate a rule, of the rule set, based on the event and the statuses of the other events. The one or more processors may determine an action to be performed based on evaluating the rule. The one or more processors may cause the action to be performed in association with the element of the set of elements.

According to some possible implementations, a non-transitory computer-readable medium may store one or more instructions that, when executed by one or more processors of a device, cause the one or more processors to receive, from a set of network devices, information associated with a set of parameters relating to a set of elements of the set of network devices. The one or more instructions may cause the one or more processors to determine an event based on the information associated with the set of parameters. The one or more instructions may cause the one or more processors to determine a rule set based on the event. The one or more instructions may cause the one or more processors to determine other events that are associated with the event based on the rule set. The one or more instructions may cause the one or more processors to determine statuses of the other events. The one or more instructions may cause the one or more processors to evaluate a rule, of the rule set, based on the statuses of the other events. The one or more instructions may cause the one or more processors to determine an action to be performed based on evaluating the rule. The one or more instructions may cause the one or more processors to perform the action in association with an element of the set of elements.

According to some possible implementations, a method may include receiving, by a device and from a set of network devices, information associated with a set of parameters relating to a set of elements of the set of network devices. The method may include determining, by the device, an event based on the set of parameters. The event may be associated with an element of the set of elements. The method may include determining, by the device, a rule set based on the event. The method may include determining, by the device, other events that are associated with the event based on the rule set. The other events may be associated with other elements of the set of elements. The method may include determining, by the device, statuses of the other events. The method may include evaluating, by the device, a rule, of the rule set, based on the event and the statuses of the other events. The method may include determining, by the device, an action to be performed based on evaluating the rule. The method may include causing, by the device, the action to be performed in association with the element.

BRIEF DESCRIPTION OF THE DRAWINGS

FIGS. 1A-1F are diagrams of an overview of an example implementation described herein;

DETAILED DESCRIPTION

The following detailed description of example implementations refers to the accompanying drawings. The same reference numbers in different drawings may identify the same or similar elements.

Management of network devices, such as routers, gateways, switches, or the like, in modern day networks has become a challenging task because of technological advancements and increased deployment complexity. Prediction of post-deployment network conditions presents a challenge based on unique combinations of inputs, untested paths, or the like. Such post-deployment network conditions may induce buggy behavior in network devices.

Network devices may be difficult to debug because the distributed nature of processing presents a lack of visibility of various network health parameters. Network health parameters, which provide an overall summary of the state of the network at any point in time, may include resource utilization (e.g., processor usage, memory usage, or the like), events in various network components, or the like. Existing debugging techniques tend to be reactive rather than proactive, are limited to individual network devices, and do not include a central entity to provide network level debugging.

Implementations described herein provide a learning-based management platform that monitors parameters of network devices, proactively predicts network events, and automatically performs actions to mitigate a potential error. Implementations described herein enable a management platform to predict potential errors based on events, and perform proactive actions to prevent the errors from occurring. In this way, implementations described herein reduce issues (e.g., network device failure, network device operating errors, packet losses, latency, etc.), thereby conserving processor and/or memory resources of network devices, and/or conserving network resources. Implementations described herein may enable a management platform to monitor information associated with hundreds, thousands, etc. of network devices, determine events, and perform actions to prevent issues from occurring.

Figure 1A:
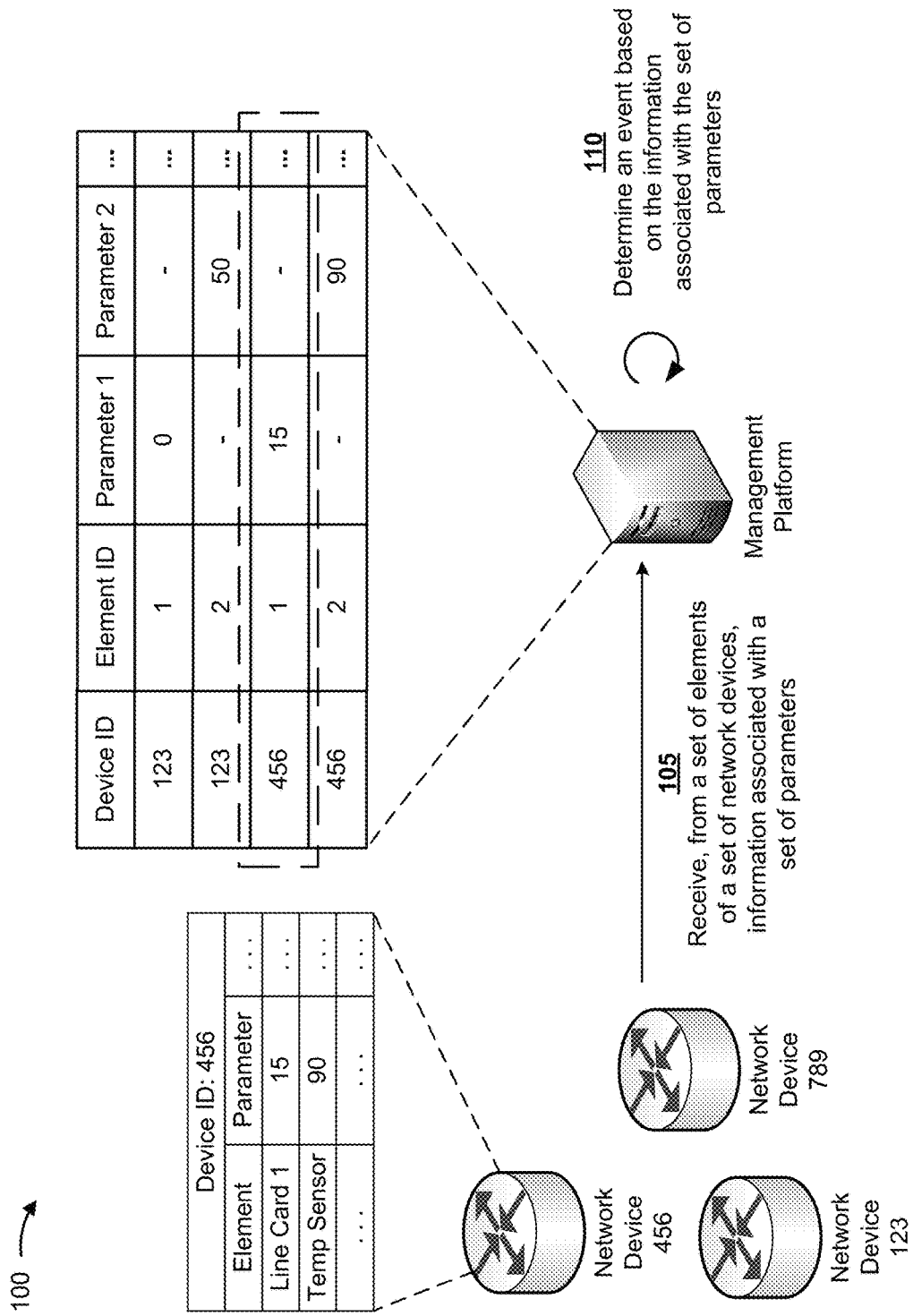

FIGS. 1A-1F are diagrams of an overview of an example implementation 100 described herein. As shown in FIG. 1A, and by reference number 105, a management platform (e.g., a server device, such as a server device of a cloud computing environment or a server device of a data center) receives, from a set of elements of a set of network devices, information associated with a set of parameters. For example, a network device (e.g., a router, a switch, a firewall, or the like) may include multiple elements (e.g., line cards, controllers, temperature sensors, software running on a line card, software running in a routing component, software running in a switching component, etc.).

For example, network device 456 stores information that indicates that an element (e.g., line card 1) is associated with a particular parameter value (e.g., 15 packet losses), and that another element (e.g., a temperature sensor) is associated with another parameter value (e.g., 90 degrees Celsius). Although only two elements and corresponding parameters are shown in example implementation 100, the management platform may monitor thousands, millions, billions, etc. of parameters.

As shown in FIG. 1A, the management platform includes a network management table that stores information associated with the set of network devices (e.g., device identifiers, element identifiers, parameter values associated with particular elements, and/or the like). As shown by reference number 110, the management platform may determine an event based on the information associated with the set of parameters. For example, an event may refer to a parameter value satisfying a threshold (e.g., a number of packet losses satisfying a threshold).

As shown in FIG. 1B, and by reference number 115, the management platform may determine a rule set based on the event. For example, the management platform may determine that the event (e.g., that line card 1 is associated with 15 packet losses) is associated with an event E. The management platform then determines a rule set E based on the event E. For example, a rule set may refer to a set of rules. As an example, a rule may include information that correlates events with an action, as described elsewhere herein.

As shown in FIG. 1C, and by reference number 120, the management platform may determine other events that are associated with the event based on the rule set (e.g., determine other events that are associated with event E based on rule set E). For example, the management platform may identify information that indicates a hierarchical relationship among event E, an event A, an event B, an event C, and/or an event D. As an example, the occurrence of event E may be dependent on the occurrence of one or more of the other events (e.g., dependent on the occurrence of event A, event B, or event C and event D). As shown by reference number 125, the management platform may determine statuses of the other events. A status may indicate whether an event has occurred, is currently occurring, is likely to occur, or the like.

Figure 1D:
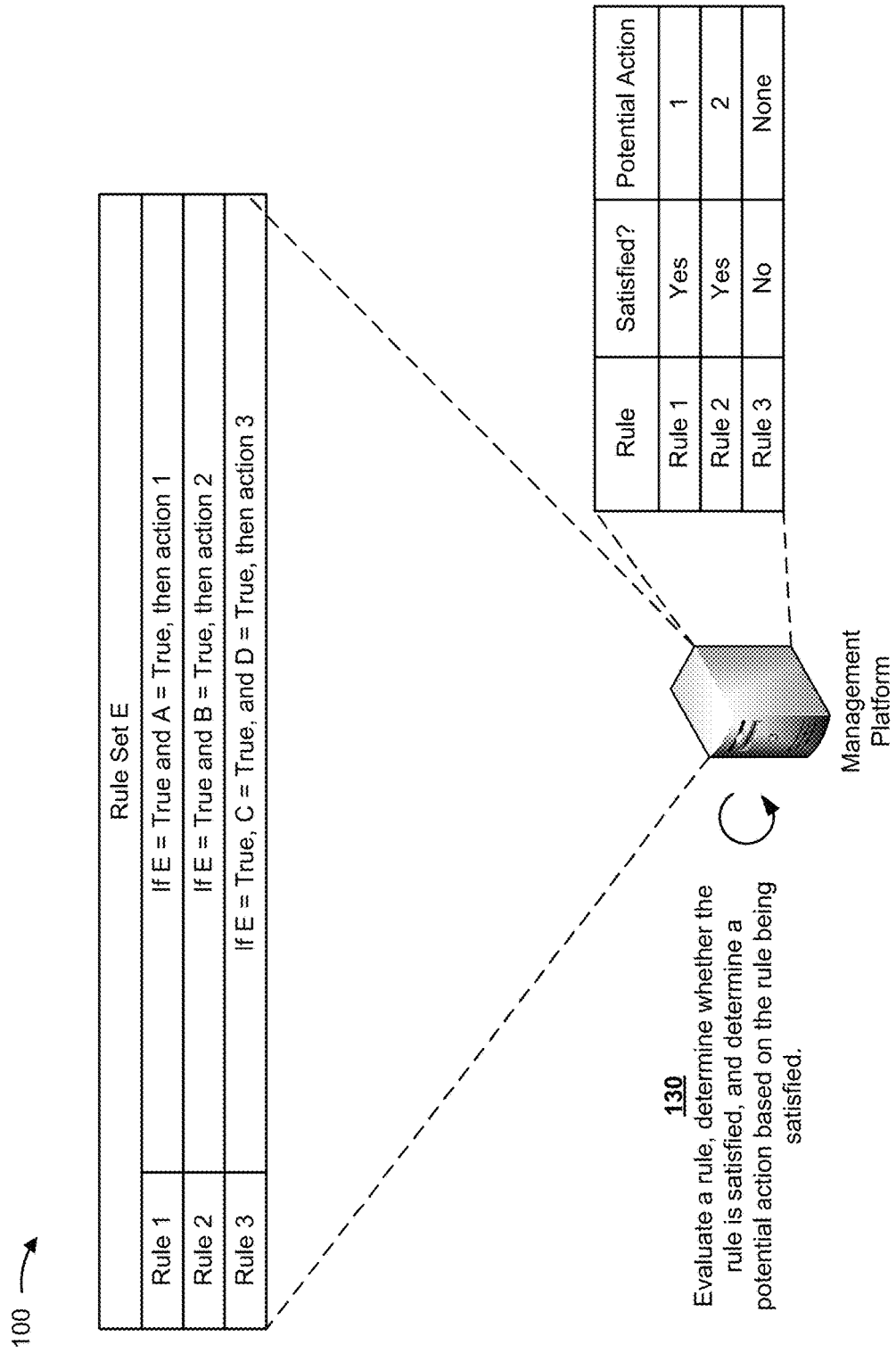

As shown in FIG. 1D, and by reference number 130, the management platform may evaluate a rule, determine whether the rule is satisfied, and determine a potential action based on the rule being satisfied. For example, rule 1 indicates that if event E is true and event A is true, then the management platform may perform a potential action 1; rule 2 indicates that if event E is true and event B is true, then the management platform may perform a potential action 2; and rule 3 indicates that if event E is true, event C is true, and event D is true, then the management platform may perform a potential action 3.

In some implementations, the management platform stores information indicating whether a rule (e.g., rule 1, rule 2, and rule 3) is satisfied (e.g., yes or no) and indicating a potential action(s) to be performed based on the rule(s) being satisfied. As shown, the management platform table indicates that if rule 1 is satisfied (i.e., yes), then the potential action is action 1, if rule 2 is satisfied (i.e., yes), then the potential action is action 2, and that if rule 3 is not satisfied (i.e., no), then there is no potential action to be performed (i.e., none). Based on the example of line card 1 associated with network device 456, when event E is true (e.g., a number of packet losses for line card 1 satisfies a threshold), and event A is true (e.g., a temperature associated with a temperature sensor satisfies a threshold), then a potential action may be for the management platform to deactivate line card 1. In some implementations, the management platform may evaluate each rule of the rule set and determine multiple potential actions to be performed.

Figure 1E:
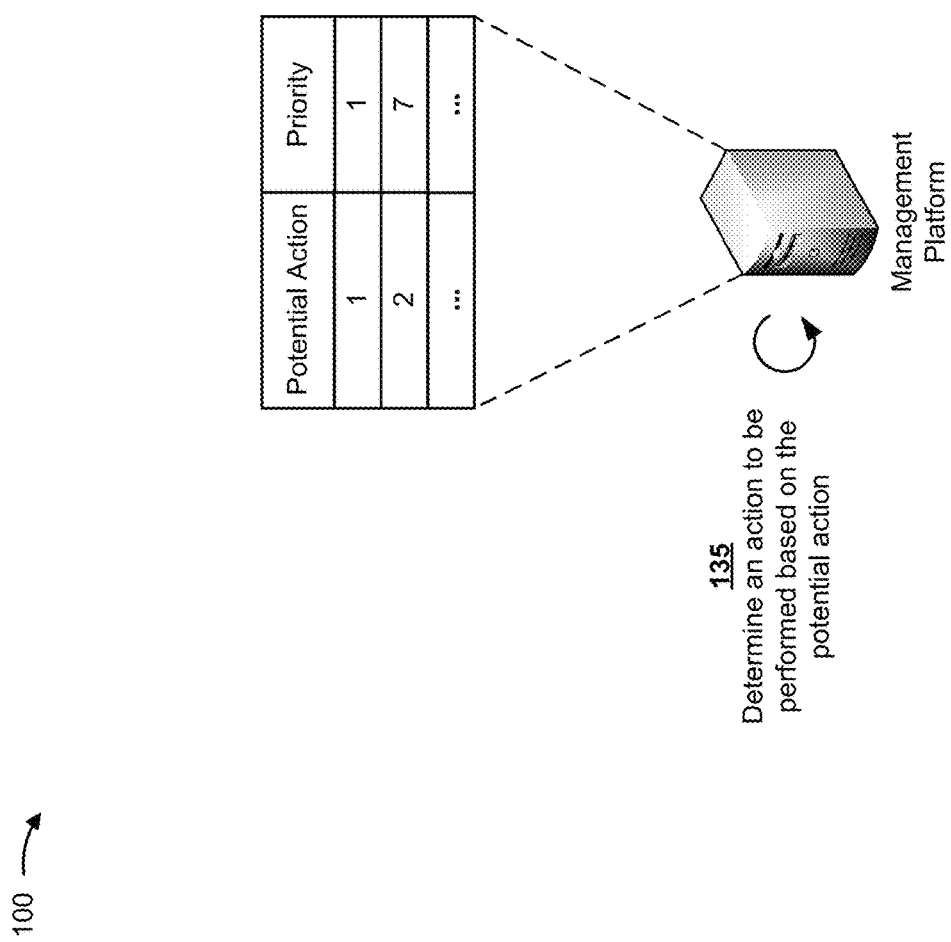

As shown in FIG. 1E, and by reference number 135, the management platform may determine an action to be performed based on the potential actions. For example, the management platform may store information indicating that there are two potential actions (e.g., potential action 1 and potential action 2) to be performed. For example, one potential action may be to deactivate line card 1 and another potential action may be to send an alert to a user device.

The management platform also stores information indicating that there are priorities associated with the potential actions. For example, a priority of 1 is associated with potential action 1, and a priority of 7 is associated with potential action 2. In some implementations, the management platform may perform potential actions based on respective priorities (e.g., perform actions associated with higher priorities before actions associated with lower priorities, or the like).

Figure 1F:
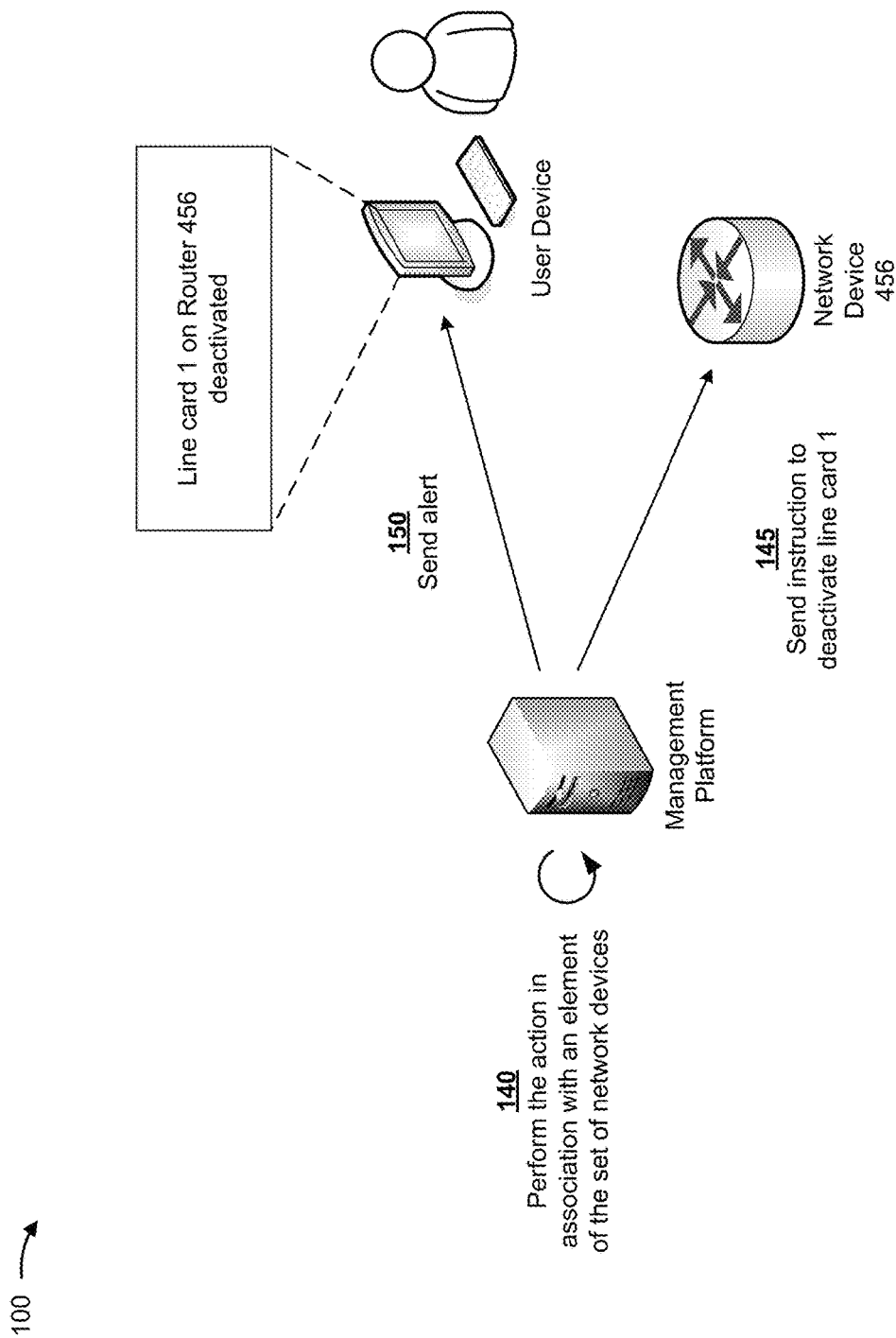

As shown in FIG. 1F, and by reference number 140, the management platform may perform the action in association with an element of the set of network devices. For example, as shown by reference number 145, the management platform sends an instruction to network device 456 to deactivate line card 1. Additionally, as shown by reference number 150, the management platform sends an alert to a user device (e.g., a computing device) indicating that line card 1 on network device 456 has been deactivated. In this way, the management platform may determine an event (e.g., that a number of packet losses satisfies a threshold), identify other events that are associated with the event (e.g., a temperature satisfying a threshold), and identify actions to be performed to prevent errors from occurring (e.g., network device operating errors, network device failures, etc.). In this way, the management platform may conserve network device resources and network resources by taking preventative (proactive) actions rather than reactive actions (e.g., performed in response to an error).

In this way, implementations described herein enable the management platform to monitor various parameters associated with a set of elements of a set of network devices, and determine events based on the parameters. Additionally, implementations described herein enable the management platform to identify rules associated with the events, identify statuses of other events, and determine actions to be performed based on the rules and the statuses of the other events. In this way, implementations described herein enable the management platform to proactively (e.g., preventatively rather than reactively) perform actions that may prevents errors from occurring. In this way, implementations described herein reduce communication issues (e.g., packet losses, latency, connectivity issues, etc.), thereby conserving processor and/or memory resources of network devices and/or conserving network resources.

As indicated above, FIGS. 1A-1F are provided merely as an example. Other examples are possible and may differ from what was described with regard to FIGS. 1A-1F.

Figure 2:
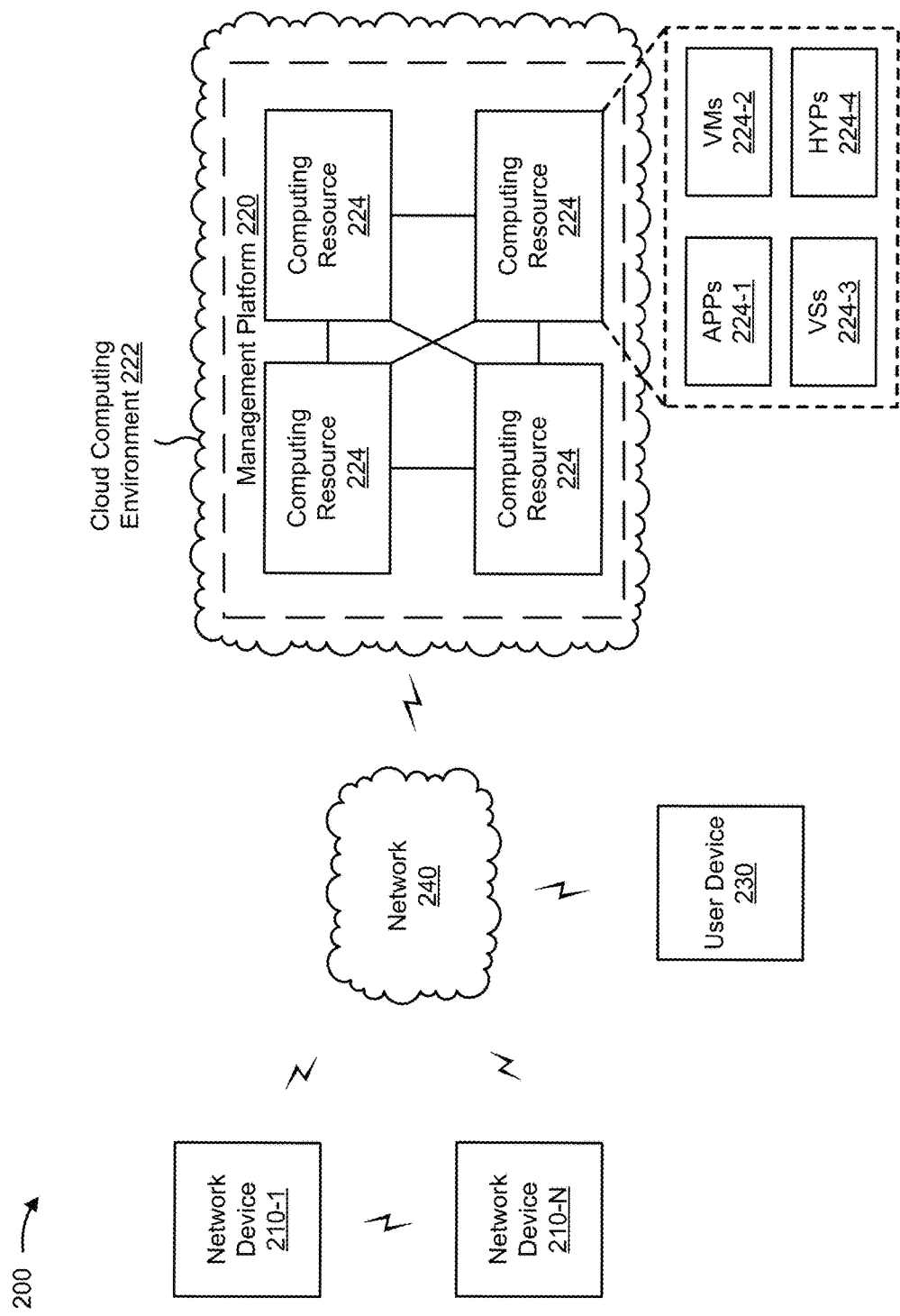
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as "network devices 210," and individually as "network device 210"), a management platform 220, a cloud computing environment 222, a set of computing resources 224, a user device 230, and a network 240. Devices of environment 200 may interconnect via wired connections, wireless connections, or a combination of wired and wireless connections.

Network device 210 includes one or more devices (e.g., one or more traffic transfer devices) capable of processing and/or transferring traffic. For example, network device 210 may include a firewall, a router, a gateway, a switch, a hub, a bridge, a reverse proxy, a server (e.g., a proxy server), a security device, an intrusion detection device, a load balancer, or a similar device.

Management platform 220 includes one or more devices capable of monitoring information associated with network devices 210, determining events based on the information, and performing actions based on the events. In some implementations, management platform 220 may be designed to be modular such that certain software components can be swapped in or out depending on a particular need. As such, management platform 220 may be easily and/or quickly reconfigured for different uses.

In some implementations, as shown, management platform 220 may be hosted in cloud computing environment 222. Notably, while implementations disclosed herein describe management platform 220 as being hosted in cloud computing environment 222, in some implementations, management platform 220 may not be cloud-based (i.e., may be implemented outside of a cloud computing environment) or may be partially cloud-based.

Cloud computing environment 222 includes an environment that hosts management platform 220. Cloud computing environment 222 may provide computation, software, data access, storage, etc. services that do not require end-user (e.g., user device 230) knowledge of a physical location and configuration of system(s) and/or device(s) that hosts management platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host management platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 230. Application 224-1 may eliminate a need to install and execute the software applications on user device 230. For example, application 224-1 may include software associated with management platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 230), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

User device 230 includes one or more devices capable of receiving, generating, storing, processing, and/or providing information associated with an event and/or action. For example, user device 230 may include a computing device, such as a desktop computer, a laptop computer, a tablet computer, a handheld computer, a server device, a mobile phone (e.g., a smart phone or a radiotelephone), or a similar type of device.

Network 240 includes one or more wired and/or wireless networks. For example, network 240 may include a cellular network (e.g., a fifth generation (5G) network, a long-term evolution (LTE) network, a code division multiple access (CDMA) network, a third generation (3G) network, and/or another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
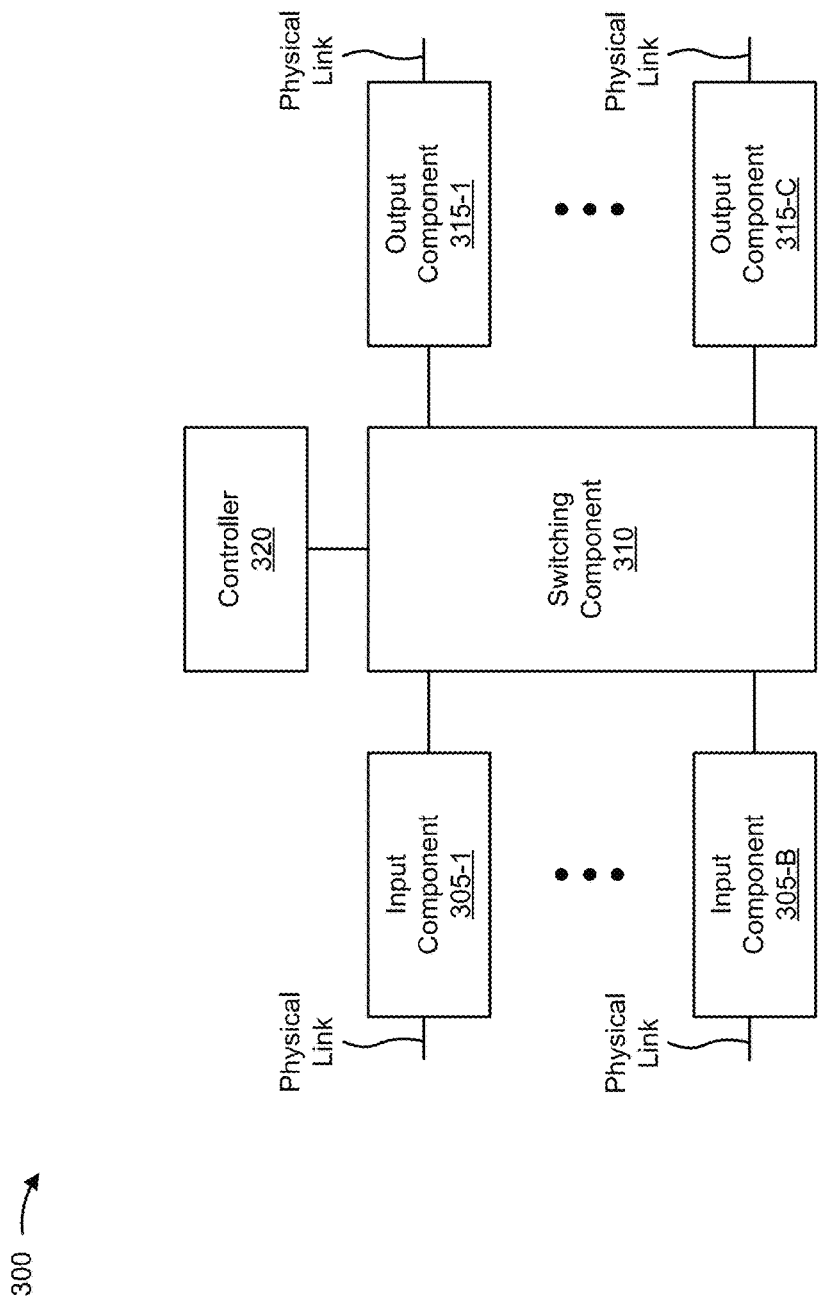
FIGS. 3A and 3B are diagrams of example components of one or more devices of FIG. 2.

FIG. 3A is a diagram of example components of a device 300. Device 300 may correspond to network device 210, management platform 220, and/or user device 230. In some implementations, network device 210 may include one or more devices 300 and/or one or more components of device 300. As shown in FIG. 3A, device 300 may include a set of input components 305, a switching component 310, a set of output components 315, and a controller 320. In some implementations, components of devices 300 may interconnect via wired connections, wireless connections, or a combination of wired and wireless connections.

Input component 305 includes a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor that takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
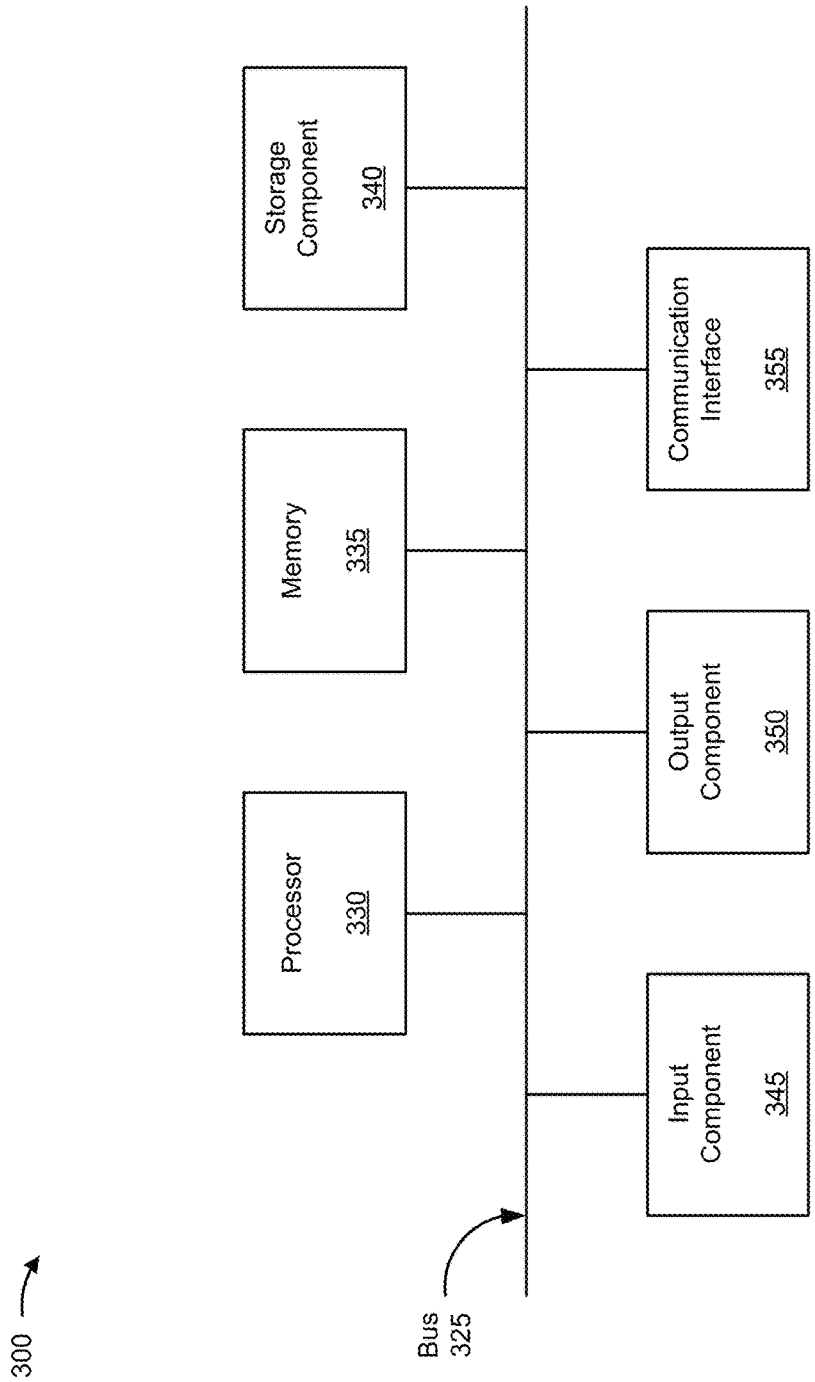

FIG. 3B is a diagram of example components of a device 300. Device 300 may correspond to network device 210, management platform 220, and/or user device 230. In some implementations, network device 210, management platform 220, and/or user device 230 may include one or more devices 300 and/or one or more components of device 300. As shown in FIG. 3B, device 300 may include a bus 325, a processor 330, a memory 335, a storage component 340, an input component 345, an output component 350, and a communication interface 355.

Bus 325 includes a component that permits communication among the components of device 300. Processor 330 is implemented in hardware, firmware, or a combination of hardware and software. Processor 330 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 330 includes one or more processors capable of being programmed to perform a function. Memory 335 includes a random access memory (RAM), a read only memory (ROM), and/or another type of dynamic or static storage device (e.g., a flash memory, a magnetic memory, and/or an optical memory) that stores information and/or instructions for use by processor 330.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 345 includes a component that permits device 300 to receive information, such as via user input (e.g., a touch screen display, a keyboard, a keypad, a mouse, a button, a switch, and/or a microphone). Additionally, or alternatively, input component 345 may include a sensor for sensing information (e.g., a global positioning system (GPS) component, an accelerometer, a gyroscope, and/or an actuator). Output component 350 includes a component that provides output information from device 300 (e.g., a display, a speaker, and/or one or more light-emitting diodes (LEDs)).

Communication interface 355 includes a transceiver-like component (e.g., a transceiver and/or a separate receiver and transmitter) that enables device 300 to communicate with other devices, such as via a wired connection, a wireless connection, or a combination of wired and wireless connections. Communication interface 355 may permit device 300 to receive information from another device and/or provide information to another device. For example, communication interface 355 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 330 executing software instructions stored by a non-transitory computer-readable medium, such as memory 335 and/or storage component 340. A computer-readable medium is defined herein as a non-transitory memory device. A memory device includes memory space within a single physical storage device or memory space spread across multiple physical storage devices.

Software instructions may be read into memory 335 and/or storage component 340 from another computer-readable medium or from another device via communication interface 355. When executed, software instructions stored in memory 335 and/or storage component 340 may cause processor 330 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 300 may include additional components, fewer components, different components, or differently arranged components than those shown in FIG. 3B. Additionally, or alternatively, a set of components (e.g., one or more components) of device 300 may perform one or more functions described as being performed by another set of components of device 300.

Figure 4:
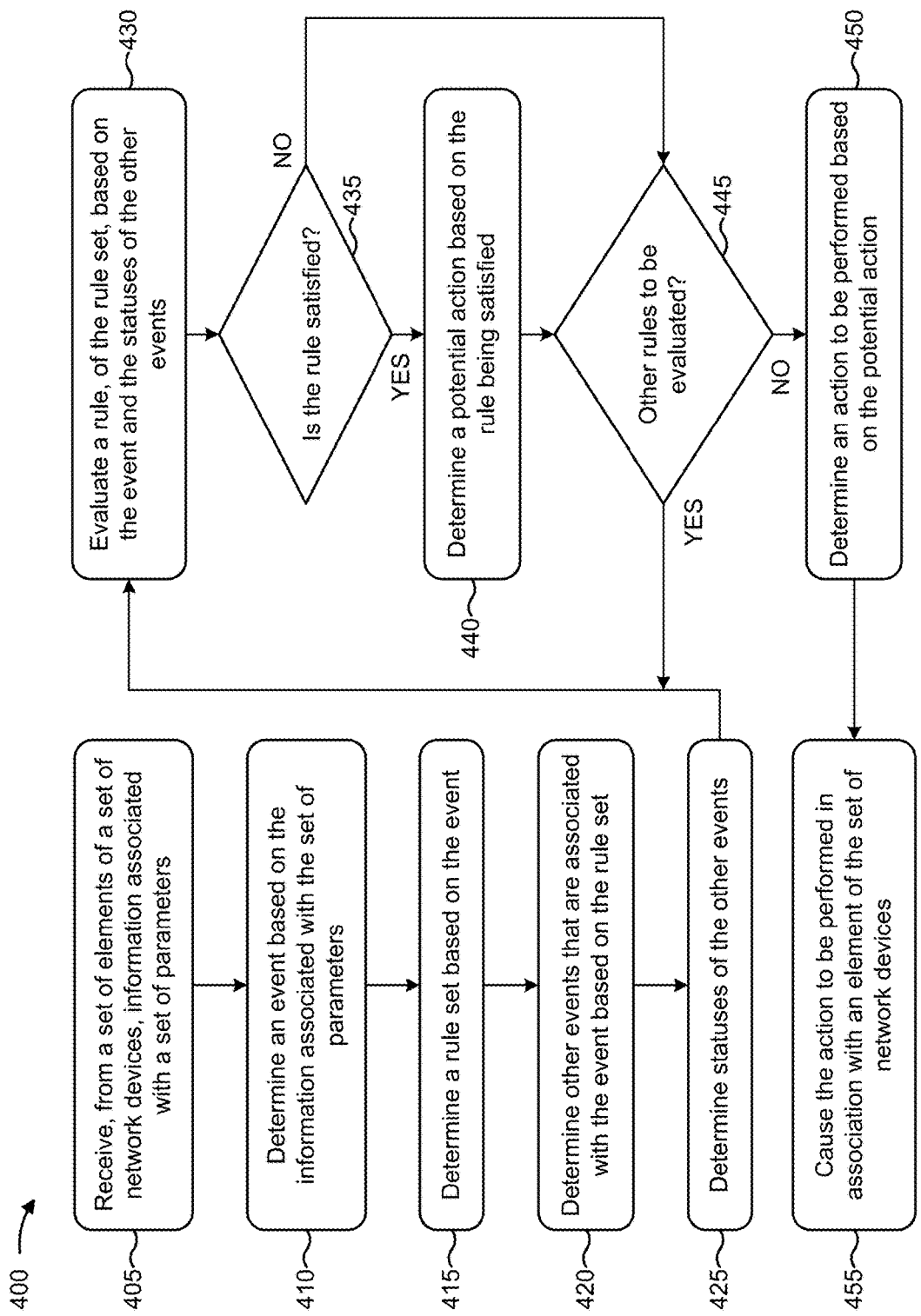
FIG. 4 is a flow chart of an example process for performing network device management.

FIG. 4 is a flow chart of an example process 400 for performing network device management. In some implementations, one or more process blocks of FIG. 4 may be performed by management platform 220. In some implementations, one or more process blocks of FIG. 4 may be performed by another device or a group of devices separate from or including management platform 220, such as network device 210, and/or user device 230.

As shown in FIG. 4, process 400 may include receiving, from a set of elements of a set of network devices, information associated with a set of parameters (block 405). For example, management platform 220 may receive, from a set of elements of a set of network devices 210, information associated with a set of parameters of network devices 210.

In some implementations, an element may include a component of network device 210, particular software that is being executed by network device 210, or the like. For example, an element may include a line card, a switch fabric card, a processor, a temperature sensor, a voltage sensor, an Ethernet controller, a Peripheral Component Interconnect (PCI) controller, an optical transmitter, software that is being executed by network device 210 to perform various functionalities, or the like.

In some implementations, a parameter may include information that is associated with an element of network device 210. For example, a parameter may include information that identifies a resource utilization (e.g., a processor utilization, a memory utilization, etc.), an interface status, a temperature, a voltage, an interface packet count, a number of packet losses, a network metric value (e.g., a bandwidth value, a throughput value, a jitter value, a latency value, etc.), or the like.

In some implementations, management platform 220 may receive the information associated with the set of parameters in association with various data formats (e.g., in a particular data format based on the particular element or type of particular element of network device 210 and/or the particular network device 210 or the type of particular network device 210 that provided the information). For example, management platform 220 may receive the information associated with the set of parameters in a JavaScript Object Notation (JSON) format, a Google Protocol Buffers (GPB) format, a Yet Another Next Generation (YANG) format, an Extensible Markup Language (XML) format, an Apache Thrift format, or the like. In some implementations, management platform 220 may prepare the information for processing by standardizing the information. In this way, management platform 220 may conserve processor and/or memory resources by representing the information associated with the set of parameters in a particular format (e.g., a standardized format) rather than attempting to process the set of parameters in various formats.

In some implementations, management platform 220 may store information associated with the set of parameters using a data structure (e.g., a table, a container, a YANG data model structure, or the like). In some implementations, the information, included in the data structure, may include information that identifies a device identifier of network device 210, a device type identifier of network device 210, a set of element identifiers of elements of network device 210, a set of element type identifiers of elements of network device 210, a set of parameters of network device 210, a geographic location of network device 210, time stamps associated with the set of parameters, a time frame associated with the set of parameters, or the like. In this way, management platform 220 may store information associated with network devices 210, analyze the information associated with the set of parameters, and determine an event based on the information, as described below.

As further shown in FIG. 4, process 400 may include determining an event based on the information associated with the set of parameters (block 410). For example, management platform 220 may determine an event based on the information associated with the set of parameters.

In some implementations, an event may include information that identifies the existence of an issue associated with an element of network device 210 (e.g., an operating error, a malfunction, a crash, or the like). Additionally, or alternatively, an event may include information that identifies that an issue may occur (e.g., that an issue does not currently exist, however may exist if correction action is not taken). For example, an event may include information that identifies the existence and/or likelihood of a hardware error, a software error, an error associated with a communication link, an error associated with a connection, or the like.

In some implementations, an event may include information that identifies a failure associated with an interface, a number of packet losses satisfying a threshold, a failure associated with an optical link, route and/or interface flapping (e.g., a situation where network device 210 advertises a destination address via one route and then another route in quick succession), a temperature associated with network device 210 satisfying a threshold (e.g., a processor temperature, an exhaust fan temperature, or the like), a processor utilization, a memory allocation error (e.g., memory leakage), or the like.

In some implementations, management platform 220 may monitor values, associated with the set of parameters, and determine an event based on the values. In some implementations, management platform 220 may determine that a value, associated with a parameter, satisfies a threshold, and determine an event based on the value satisfying the threshold. For example, assume that a parameter includes an operating temperature, and that a value includes a particular value (e.g., a particular temperature). In this case, management platform 220 may determine an event based on the value satisfying a threshold operating temperature (e.g., indicating that an element of network device 210 is overheated, is overheating, or the like). As another example, assume that a parameter includes an operating temperature, and that operating temperature values have increased by a particular temperature across a time frame. In this case, management platform 220 may determine an event based on a variation, in operating temperatures, satisfying a threshold (e.g., indicating that an element of network device 210 is at risk of overheating).

In some implementations, an event may be based on multiple parameters (e.g., a hundred, thousand, million, billion, etc. parameters and corresponding values). For example, management platform 220 may monitor hundreds, thousands, etc. of network devices 210 and/or monitor thousands, millions, etc. of parameters associated with each network device 210.

In some implementations, management platform 220 may store, in a data structure, information associated with the event. For example, management platform 220 may store information that identifies network device 210, an element of network device 210 that is associated with the event, a temporal indicator that is associated with the event (e.g., a time stamp, a time frame, etc.), or the like. In this way, management platform 220 may determine a rule set and/or rules associated with the event, determine other events that are associated with the event, and determine an action associated with the event, as described elsewhere herein.

As further shown in FIG. 4, process 400 may include determining a rule set based on the event (block 415). For example, management platform 220 may determine a rule set based on information associated with the event. In some implementations, a rule set may include a set of rules associated with an event. For example, a rule, of a rule set, may include information that correlates a set of events and an action. In other words, a rule may include a set of conditions that results in one or more outputs if the conditions are satisfied.

In some implementations, an action may include an operation that may be performed by management platform 220 to prevent, mitigate, and/or rectify an issue and/or potential issue associated with a set of events. For example, an action may include gathering additional information, evaluating other rules, providing information to user device 230, providing an instruction to network device 210 (e.g., to perform a reboot, to shut down, or the like), providing an instruction to an element of network device 210 to perform an action (e.g., to perform a reboot, to go offline, or the like), or the like.

In some implementations, management platform 220 may determine a rule set based on stored information. For example, management platform 220 may receive, from user device 230 (e.g., which may have received an input from a user), information that identifies a rule set. In some implementations, management platform 220 may store the information that identifies the rule set, may provide a request for the information that identifies the rule set (e.g., request the information that identifies the rule set from a database server), or the like.

In some implementations, management platform 220 may determine the rule set based on performing a technique. For example, management platform 220 may use one or more machine learning techniques to analyze data (e.g., training data, such as data that identifies information associated with parameters, events, and/or actions) and create models. The machine learning techniques may include supervised and/or unsupervised techniques, such as artificial networks, case-based reasoning, Bayesian statistics, learning automata, Hidden Markov Modeling, linear classifiers, quadratic classifiers, decision trees, association rule learning, forward chaining, or the like.

Additionally, or alternatively, management platform 220 may use another kind of computer-implemented technique, such as artificial intelligence, machine perception, or computer vision, to analyze data and generate models. For example, management platform 220 may receive information that identifies a set of events and an action associated with the set of events (e.g., an action to prevent, mitigate, rectify, etc. an issue associated with the set of events), and may implement a technique (e.g., to train a model). In this way, management platform 220 may receive additional information (e.g., that identifies events), and may determine rule sets and/or actions based on the model.

In some implementations, management platform 220 may create a model using information associated with a first network device 210, and/or a first set of network devices 210, and may use the model in association with a second network device 210, a second set of network devices 210, or the like. In this way, management platform 220 may identify rules and/or actions that were successful in preventing an issue, mitigating an issue, rectifying an issue, or the like, in association with a particular network device 210, and may apply the rules in association with another network device 210, as described elsewhere herein.

In some implementations, management platform 220 may determine the event, identify a rule set that is associated with the event, and determine other events that are associated with particular rules of the rule set, as described below.

As further shown in FIG. 4, process 400 may include determining other events that are associated with the event based on the rule set (block 420), and determining statuses of the other events (block 425). For example, management platform 220 may determine a set of other events that are associated with the event based on the rule set, and determine statuses of other events that are associated with the event. In some implementations, management platform 220 may determine the other events based on the rule set. For example, management platform 220 may identify a rule of the rule set, and determine a set of events that are associated with the rule. In some implementations, the event and the other events may include a hierarchical relationship. For example, the event may be dependent on the occurrence of one or more of the other events. Additionally, or alternatively, one or more of the other events may be dependent on the event.

In some implementations, management platform 220 may determine a status of another event (e.g., of the set of other events). For example, the status may be indicative as to whether an event, of the other events, has occurred, is occurring, is likely to occur, or the like. In some implementations, management platform 220 may determine a status of another event based on the information associated with the set of parameters. For example, management platform 220 may identify a time frame associated with the event, and determine other events that are associated with the time frame. In this way, management platform 220 may determine statuses of the other events, and evaluate rules based on the statuses, as described below.

As further shown in FIG. 4, process 400 may include evaluating a rule, of the rule set, based on the event and the statuses of the other events (block 430), determining whether the rule is satisfied (block 435), and if the rule is satisfied (block 435—YES), determining a potential action based on the rule being satisfied (block 440). For example, management platform 220 may evaluate a rule, of the rule set, based on the event and the statuses of the other events, and determine whether the rule is satisfied. If management platform 220 determines that the rule is satisfied, then management platform 220 may determine a potential action based on the rule being satisfied.

In some implementations, management platform 220 may determine that a rule is satisfied based on the event and the statuses of the other events. For example, assume that the rule includes the structure: "if event A=true, and event B=true, then perform action 1." In this case, if both events A and B are "true" (e.g., management platform 220 has determined that both events have occurred, are likely to occur (e.g., have a likelihood of occurring that satisfies a threshold), or the like), then management platform 220 may identify a potential action (e.g., "action 1"). In some implementations, a potential action may include an action that may be performed by management platform 220 based on other potential actions, as described elsewhere herein.

As further shown in FIG. 4, if management platform 220 determines a potential action based on the rule being satisfied, or if management platform 220 determines that the rule is not satisfied (block 435—NO), then process 400 may include determining whether other rules, of the rule set, are to be evaluated (block 445). For example, management platform 220 may determine whether another rule, of the rule set, is to be evaluated. That is, management platform 220 may determine whether the rule set includes other rules, and/or if the other rules have yet to be evaluated. In some implementations, if management platform 220 determines that other rules are to be evaluated, then management platform 220 may iteratively perform operations of blocks 430-445. In some implementations, management platform 220 may evaluate a thousand rules, a million rules, or the like, to determine potential actions. Additionally, management platform 220 may perform one or more big data techniques to efficiently process the set of rules. In this way, management platform 220 may determine one or more potential actions, and determine one or more actions to perform based on the one or more potential actions, as described below.

As further shown in FIG. 4, if management platform 220 determines that each rule of the rule set has been evaluated (block 445—NO), then process 400 may include determining an action to be performed based on the potential action (block 450), and causing the action to be performed in association with an element of the set of network devices (block 455). For example, management platform 220 may determine an action to be performed based on potential actions, and perform the action in association with an element of network device 210.

In some implementations, if management platform 220 determines multiple potential actions, then management platform 220 may perform each action of the multiple potential actions. Additionally, or alternatively, management platform 220 may determine a score for each of the multiple potential actions. For example, management platform 220 may receive and/or determine information that identifies a score associated with an action (e.g., information that is indicative of a rank, a designation, a priority, or the like). Additionally, or alternatively, management platform 220 may perform an action based on scores associated with the potential actions. For example, management platform 220 may perform the potential actions based on scores, such as by performing the potential actions in descending order, ascending order, or the like. That is, management platform 220 may perform an action, that is associated with a higher score, before performing another action that is associated with a lower score. Additionally, or alternatively, management platform 220 may perform potential actions that are associated with scores that satisfy a threshold, that are associated with the top scores (e.g., the top three, five, ten, etc.), or the like. Additionally, or alternatively, management platform 220 may perform an action that includes the highest score (e.g., indicative of being the highest priority, or the like), and may prevent other potential actions from being performed (e.g., potential actions with lower scores).

In some implementations, a score may be indicative of the likelihood that the corresponding action is to rectify or mitigate an issue associated with the event. For example, management platform 220 may receive information to train a model (e.g., information associated with performing particular actions and results of the action), and determine a score based on the model. That is, the model may correlate particular actions and the efficacy of the actions in rectifying and/or mitigating an issue, and determine scores of the actions based on the efficacy.

In some implementations, management platform 220 may automatically cause an action to be performed by logging the event, troubleshooting the event, raising an alarm, sending a message (e.g., a notification, a Simple Network Management Protocol (SNMP) trap message, or the like), providing an instruction to network device 210 to reboot, providing an instruction to disable network device 210, performing a diagnosis of network device 210, causing a particular script to be run in association with network device 210, or the like.

In some implementations, management platform 220 may automatically cause an action to be performed based on causing a message (e.g., a notification, an email, a short message service (SMS) message, or the like) to be sent to user device 230 based on the event, based on performing an action in association with an element of network device 210, or the like. In this way, management platform 220 may notify a network operator of a particular event, and/or that an action has been performed. In some implementations, the message may include information that identifies network device 210, an element of network device 210, parameters and/or values associated with network device 210, or the like. Additionally, in this way, management platform 220 may reduce the need for a network operator to cause user device 230 to perform searches for particular information, thereby conserving processor and/or memory resources of management platform 220, network device 210, and/or user device 230, and/or conserving network resources. Additionally, implementations described herein enable management platform 220 to provide information to user device 230 that enables a network operator to readily identify an issue associated with a network and/or localize an issue, thereby minimizing the negative effects of an issue (e.g., packet loss, high latency, etc.).

In some implementations, management platform 220 may automatically cause an action to be performed in association with network device 210. For example, management platform 220 may provide an instruction for network device 210 to reboot, to go offline, to update information (e.g., a software image, configuration information, or the like), to bring down an interface, or the like. In this way, management platform 220 may provide an instruction to network device 210 that causes network device 210 to perform a particular action. As an example, assume that network device 210 is associated with an error (e.g., a connectivity error, a bug, or the like). In this case, management platform 220 may cause network device 210 to go offline, thereby preventing other network devices 210 from providing network traffic to network device 210 (e.g., prevent an error from being exacerbated). In this way, implementations described herein reduce packet loss, latency, jitter, etc., and thereby conserve network device 210 resources and/or network resources.

In some implementations, management platform 220 may provide an instruction to an element of network device 210 to perform an action in association with another element of network device 210. For example, assume that a first element of network device 210 (e.g., a processor, a line card, etc.) is associated with an event (e.g., an operating temperature that satisfies a threshold). In this case, management platform 220 may provide an instruction to a second element of network device 210 (e.g., a cooling fan) to activate. In this way, implementations described herein enable management platform 220 to perform proactive actions that reduce operating errors and/or device failures associated with network devices 210. In this way, implementations described herein conserve processor and/or memory resources of network devices 210 and/or conserve network resources.

In some implementations, management platform 220 may receive information that identifies a result of the action based on causing the action to be performed. For example, assume that management platform 220 caused the action to be performed, and that the action is associated with a particular outcome (e.g., prevented the issue from occurring, did not prevent the issue from occurring, or the like). In this case, management platform 220 may receive information that identifies the outcome associated with the action. Additionally, management platform 220 may perform a machine learning technique based on the received information. For example, management platform 220 may identify results of the action, and update one or more models that are used to determine rules, actions, scores, priorities, or the like.

In some implementations, management platform 220 may create a model using information associated with a first network device 210, a first set of network devices 210, or the like, and may use the model in association with a second network device 210, a second set of network devices 210, or the like. For example, assume that management platform 220 performs the action in association with a particular network device 210. In this case, management platform 220 may update a model associated with another network device 210 based on performing the action in association with the particular network device 210.

In this way, implementations described herein enable management platform 220 to use information associated with a particular system (e.g., set of network devices 210), and determine actions to be performed in association with other systems based on the information. Additionally, in this way, implementations described herein enable management platform 220 to update models based on information associated with performing particular actions (e.g., actions that were successful in rectifying and/or mitigating an issue, actions that were not successful in rectifying and/or mitigating an issue, or the like). Thereby, implementations described herein enable management platform 220 to more accurately identify actions to be performed based on underlying models. In this way, processor and/or memory resources of network devices 210 and/or management platform 220 may be conserved, and network resources may be conserved by reducing a number of issues, errors, etc.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein reduce a number of communication issues, operating errors, and/or the like, associated with network devices. For example, implementations described herein enable a management platform to monitor parameters associated with the network devices, determine events, evaluate rules based on the events, and determine actions to be performed to prevent, mitigate, and/or rectify a potential issue associated with the event. Implementations described herein enable a management platform to be proactive, rather than reactive, in association with event and/or error detection, thereby conserving processor and/or memory resources of network devices, and/or conserving network resources based on reducing and/or preventing communication issues (e.g., packet losses, latency, etc.) by taking preventative action.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive, from a set of elements of a set of network devices, information associated with a set of parameters;
determine an event based on the set of parameters, the event being associated with an element of the set of elements;
determine a rule set based on the event;
determine other events that are associated with the event based on the rule set,
the other events being associated with other elements of the set of elements;
determine statuses of the other events based on the information associated with the set of parameters;
evaluate a rule, of the rule set, based on the event and the statuses of the other events;
determine a first action to be performed based on evaluating the rule;
determine a second action to be performed based on the rule set;
determine a set of scores associated with the first action and the second action; and
cause the first action and the second action to be performed in an order based on the set of scores.

2. The device of claim 1, where the one or more processors are further to:
evaluate another rule of the rule set;
where the one or more processors, when determining the second action to be performed, are to:
determine the second action based on evaluating the other rule.

3. The device of claim 1, where the one or more processors are further to:
determine that another rule, of the rule set, is satisfied based on evaluating the other rule;
determine a third action to be performed based on the other rule being satisfied;
determine a first score, of the set of scores, associated with the first action;
determine a second score, of the set of scores, associated with the second action;
determine a third score, of the set of scores, associated with the third action; and
compare the first score and the second score;
where the one or more processors, when causing the first action and the second action to be performed in the order based on the set of scores, are to:
cause the first action to be performed before the second action based on comparing the first score and the second score; and
where the one or more processors are further to:
prevent the third action from being performed based on the third score.

4. The device of claim 1, where the one or more processors, when determining the second action to be performed, are to:
determine the second action to be performed based on another rule of the rule set;
where the one or more processors are further to:
determine a first priority associated with the first action;
determine a second priority associated with the second action; and
compare the first priority and the second priority; and
where the one or more processors, when causing the first action and the second action to be performed in the order based on the set of scores, are to:
cause the first action to be performed before the second action based on the first priority and the second priority.

5. The device of claim 1, where the one or more processors are further to:
determine another rule set based on evaluating the rule;
evaluate another rule, of the other rule set, based on determining the other rule set; and
determining another action to be performed based on evaluating the other rule.

6. The device of claim 1, where the first action includes providing an instruction to a network device, of the set of network devices, to reboot, troubleshoot, or disable the element.

7. The device of claim 1, where the one or more processors are further to:
identify a time frame associated with the event; and
where the one or more processors, when determining the other events, are to:
determine the other events based on the time frame.

8. A non-transitory computer-readable medium storing instructions, the instructions comprising:
one or more instructions that, when executed by one or more processors, cause the one or more processors to:
receive, from a set of network devices, information associated with a set of parameters relating to a set of elements of the set of network devices;
determine an event based on the information associated with the set of parameters;
determine a rule set based on the event;
determine other events that are associated with the event based on the rule set;
determine statuses of the other events;
evaluate a rule, of the rule set, based on the statuses of the other events;
determine a first action to be performed based on evaluating the rule;
determine a second action to be performed based on the rule set;
determine a set of scores associated with the first action and the second action; and
perform the first action and the second action in an order based on the set of score.

9. The non-transitory computer-readable medium of claim 8, where the one or more instructions, when executed by the one or more processors, further cause the one or more processors to:
determine that the rule is satisfied based on evaluating the rule;
determine another rule set based on the rule being satisfied; and
evaluate other rules, of the other rule set, to determine other actions to be performed.

10. The non-transitory computer-readable medium of claim 8,
where the one or more instructions, when executed by the one or more processors, further cause the one or more processors to:
determine a third action to be performed based on another rule of the rule set;
determine a first score, of the set of scores, associated with the first action;
determine a second score, of the set of scores, associated with the second action; and
determine a third score, of the set of scores, associated with the third action;
where the one or more instructions, that cause the one or more processors to perform the first action and the second action in the order based on the set of scores, cause the one or more processors to:
perform the first action based on the first score, and
perform the second action based on the second score; and
where the one or more instructions, when executed by the one or more processors, further cause the one or more processors to:
prevent the third action from being performed based on the third score.

11. The non-transitory computer-readable medium of claim 8, where the one or more instructions, that cause the one or more processors to determine the second action, cause the one or more processors to:
determine the second action to be performed based on another rule of the rule set;
where the one or more instructions, when executed by the one or more processors, further cause the one or more processors to:
determine a first score, of the set of scores, associated with the first action, and
determine a second score, of the set of scores, associated with the second action; and
where the one or more instructions, that cause the one or more processors to perform the first action and the second action in the order based on the set of scores, cause the one or more processors to:
perform the first action before the second action based on the first score and the second score.

12. The non-transitory computer-readable medium of claim 8, where the event is associated with a first element, and the first action is performed in association with a second element.

13. The non-transitory computer-readable medium of claim 8, where the one or more instructions, when executed by the one or more processors, further cause the one or more processors to:
determine a value of a parameter of the set of parameters;
determine that the value satisfies a threshold; and
where the one or more instructions, that cause the one or more processors to determine the event, cause the one or more processors to:
determine the event based on the value satisfying the threshold.

14. The non-transitory computer-readable medium of claim 8, where the element includes:
a line card;
a processor; or
a sensor.

15. A method, comprising:
receiving, by a device and from a set of network devices, information associated with a set of parameters relating to a set of elements of the set of network devices;
determining, by the device, an event based on the set of parameters,
the event being associated with an element of the set of elements;
determining, by the device, a rule set based on the event;
determining, by the device, other events that are associated with the event based on the rule set,
the other events being associated with other elements of the set of elements;
determining, by the device, statuses of the other events;
evaluating, by the device, a rule, of the rule set, based on the event and the statuses of the other events;
determining, by the device, a first action to be performed based on evaluating the rule;
determining, by the device, a second action to be performed based on the rule set;
determining, by the device, a set of scores associated with the first action and the second action; and
causing, by the device, the first action and the second action to be performed in an order based on the set of scores.

16. The method of claim 15, further comprising:
receiving, in association with a time frame, information associated with a first network device of the set of network devices,
the event being associated with the first network device;
identifying information associated with a second network device of the set of network devices based on the time frame; and
where determining the other events comprises:
determining the other events based on the information associated with the second network device.

17. The method of claim 15, further comprising:
receiving information that identifies a result of the first action;
updating a model based on the information that identifies the result of the first action; and
determining another action to be performed based on the model.

18. The method of claim 15, further comprising:
determining a third action to be performed based on the rule set;
determining a first score, of the set of scores, associated with the first actions; and
determining a second score, of the set of scores, associated with the third action;
where causing the first action to be performed comprises:
   causing the first action to be performed based on the first score; and
where the method further comprises:
   preventing the third action from being performed based on the second score.

19. The method of claim 15, where the event is indicative of a potential error, and where the first action is performed to mitigate the potential error.

20. The method of claim 15, where determining the rule set based on the event comprises:
determining the rule set using one or more machine learning techniques.

* * * * *